INVENTOR
THOMAS B. HORGAN
BY Francis V. Giolma
ATTORNEY

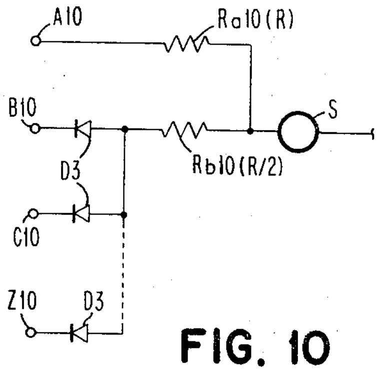
FIG. 10
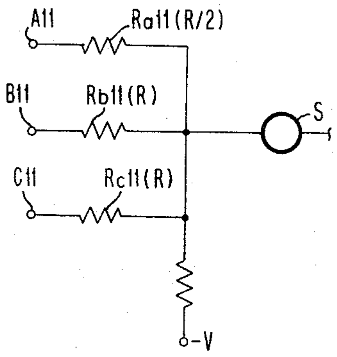
FIG. 11a
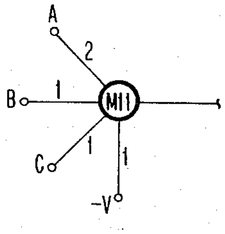
FIG. 11b
| | A11 | B11 | C11 | BIAS | |
|---|---|---|---|---|---|
| UP | 2 | 1 | 1 | -1 | 3 |
| DOWN | -2 | -1 | -1 | -1 | -5 |
| | 4 | 2 | 2 | | |
FIG. 11c

| | A12 | B12 | C12 | BIAS | |
|---|---|---|---|---|---|
| UP | 2 | 1 | 0 | 0 | 3 |
| DOWN | -2 | -1 | -2 | 0 | -5 |
| | 4 | 2 | 2 | | |
FIG. 12a
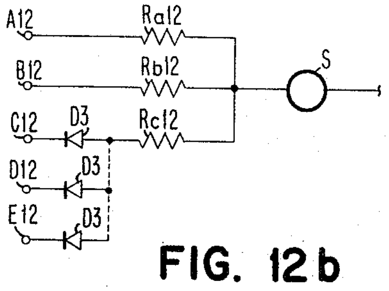
FIG. 12b
| A13 | B13 | C13 | BIAS |
|---|---|---|---|
| 1 | 1 | 1 | 0 |
| -3 | -1 | -1 | 0 |
FIG. 13a
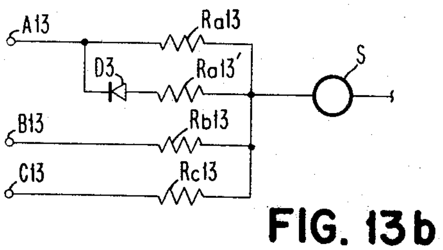
FIG. 13b
| A14 | B14 | C14 | BIAS |
|---|---|---|---|
| 0 | 1 | 2 | 0 |
| -4 | -1 | 0 | 0 |
FIG. 14a
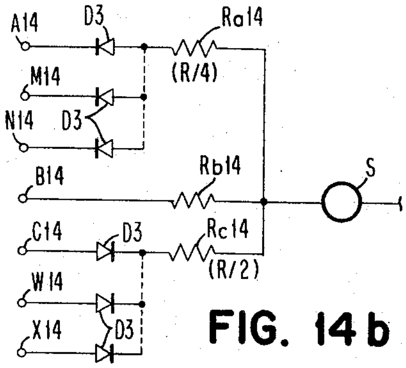
FIG. 14b
| A15 | B15 | C15 | BIAS |
|---|---|---|---|
| 1 | 2 | 0 | 0 |
| -3 | 0 | -2 | 0 |
FIG. 15a
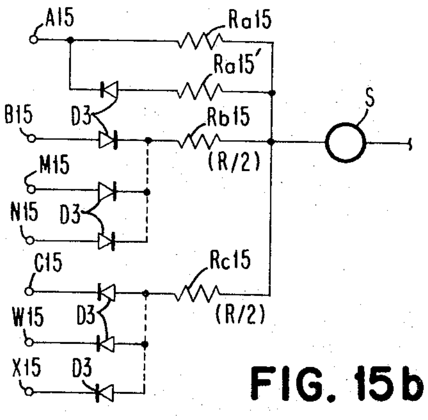
FIG. 15b

United States Patent Office 3,335,293

Patented Aug. 8, 1967

3,335,293

THRESHOLD LOGIC CIRCUIT WITH QUASI-LINEAR CURRENT SUMMING

Thomas B. Horgan, Endwell, N.Y., assignor to International Business Machines Corporation, New York, N.Y., a corporation of New York Filed June 25, 1964, Ser. No. 377,803

3 Claims. (Cl. 307—88.5)

Figure 1A:
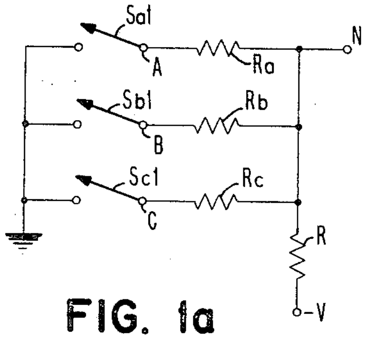

This invention relates generally to logic function devices and it has reference in particular to threshold logic devices.

Generally stated, it is an object of this invention to provide an improved logic threshold concept.

More specifically, it is an object of this invention to provide a quasi-linear approach to the logic threshold concept.

It is an important object of this invention to improve the design tolerance situation of threshold logic devices.

Another object of this invention is to provide for using a hybrid diode-linear approach to make possible the realization of complex logic statements in a single configuration.

Yet another object of the invention is to provide for eliminating the usual biasing or tie-off resistor used in the conventional Kirchoff summing circuit.

It is also an object of the present invention to provide an approach for increasing the effective margin between different numbers of inputs in majority logic circuits.

A further object is to achieve threshold logic in a manner which is improved over the conventional resistive or analog current summing method.

It is also an important object of the invention to achieve a logic circuit approach having the best features of resistor or analog logic and diode logic.

A further important object of the invention is to provide for modifying a conventional resistive or analog logic circuit so as to provide for incorporating a diode or other non-linear element, and then once these elements are in place adding other diode elements whereby diode logic or vertex statements such as AND and OR functions can easily be performed with no increase in the tolerance problem.

The foregoing and other objects, features and advantages of the invention will be apparent from the following more particular descriptions of preferred embodiments of the invention as illustrated in the accompanying drawings.

Figure 1B:
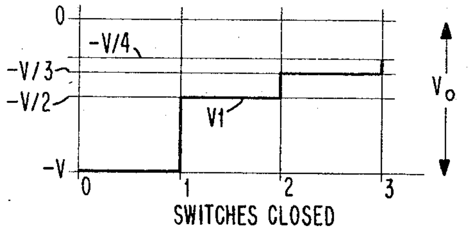
Figure 2A:
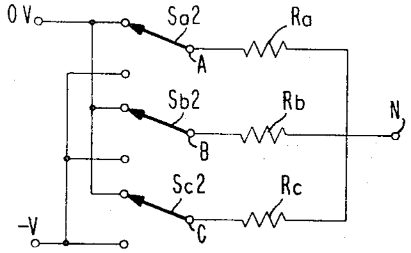
Figure 2B:
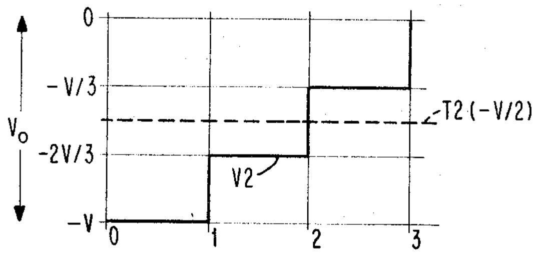
Figure 3A:
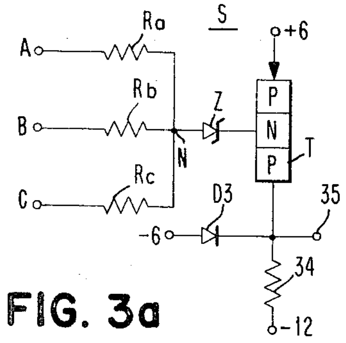
Figure 3B:
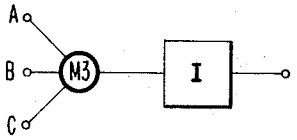
Figure 5:
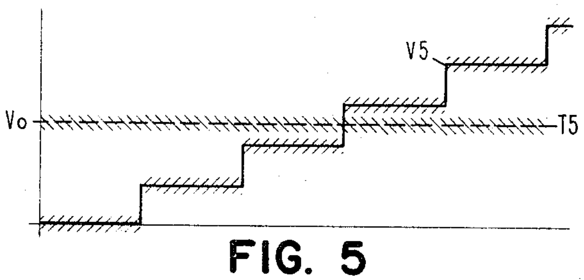
Figure 4A:
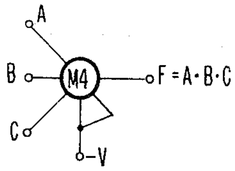
Figure 4B:
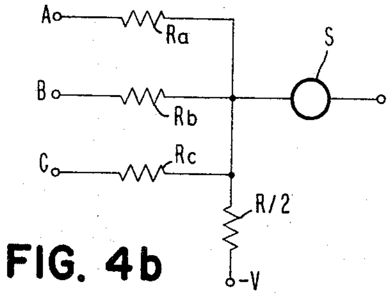
Figure 6B:
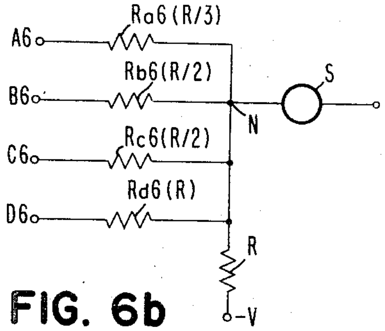
Figure 6A:
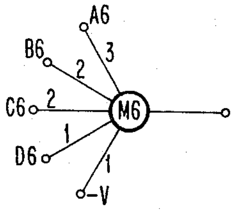
Figure 7A:
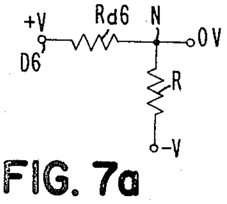
Figure 7B:
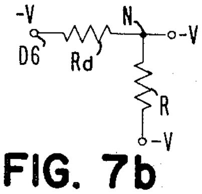
Figure 8:
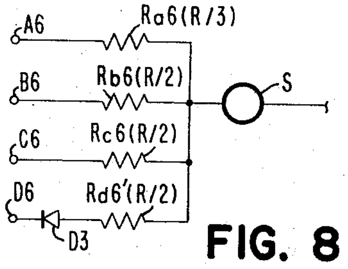
Figure 9A:
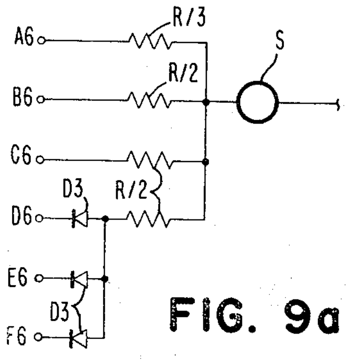
Figure 9B:
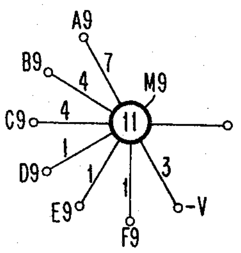

In the drawings:

FIGURE 1*a* is a schematic diagram of a conventional Kirchoff adder;

FIGURE 1*b* is an illustration of the voltage levels achieved at the summing node relative to the number of switches closed;

FIGURE 2*a* is a schematic diagram of a threshold circuit utilizing single-pole double-throw switches which are connected either to one or the other of two definite voltage levels such as, for example, zero volts and —V volts;

FIGURE 2*b* is an illustration of the voltage levels at the summing junction versus the number of switches closed in the FIGURE 2*a*;

FIGURE 3*a* is a schematic diagram of a threshold circuit illustrating one form of sensing device for determining when the threshold level is reached:

FIGURE 3*b* is a diagrammatic representation of the circuit of 3*a*;

FIGURE 4*a* is a diagrammatic representation of a three-way AND circuit majority block;

FIGURE 4*b* is a diagrammatic circuit of the three-way AND circuit of FIGURE 4*a*;

FIGURE 5 is an illustration of the staircase effect on the voltage level of a majority threshold circuit showing the tolerance effects;

FIGURE 6*a* is a diagrammatic representation of a nine input majority threshold block;

FIGURE 6*b* is a schematic circuit diagram of the threshold block of FIGURE 6*a*;

FIGURE 7*a* is a schematic diagram of a portion of the circuit of FIGURE 6*b* under one set of voltage conditions;

FIGURE 7*b* is a schematic diagram of a portion of the FIGURE 6*b* under different voltage conditions;

FIGURE 8 is a schematic diagram showing the circuit of FIGURE 6*b* modified in accordance with the invention;

FIGURE 9*a* is a schematic diagram of a majority logic circuit embodying the features of the invention;

FIGURE 9*b* is a schematic representation of a threshold circuit with conventional circuitry for performing the logic function of the circuit of FIGURE 9*a*;

FIGURE 10 is a schematic diagram of a multiple AND logic block embodying the features of the invention;

FIGURE 11*a* is a schematic diagram of a majority threshold logic circuit;

FIGURE 11*b* is a diagrammatic representation of the logic circuit of FIGURE 11*a*;

FIGURE 11*c* is a matrix representation of the parameters of the circuit of FIGURE 11*a*;

FIGURE 12*a* is a matrix representation similar to that of FIGURE 11*c*, but which has been modified;

FIGURE 12*b* is a schematic diagram of the circuit corresponding to the matrix representation of the FIGURE 12*a*;

FIGURE 13*a* is a further modified matrix representation of a threshold logic circuit;

FIGURE 13*b* is a diagrammatic representation of the logic circuit of FIGURE 13*a*;

FIGURE 14*a* is a yet further modified matrix representation of a logic circuit;

FIGURE 14*b* is a diagrammatic representation of the circuit of FIGURE 14*a*;

FIGURE 15*a* is still a further modified matrix representation of a threshold circuit;

FIGURE 15*b* is a diagrammatic representation of the logic circuit corresponding to the matrix of FIGURE 15*a*.

An important feature of the present invention is a consideration of and the improvement of the tolerance problem normally associated with the resistive logic. Referring to FIGURE 1*a*, there is illustrated a more or less conventional Kirchoff adder circuit approach in which normally open switches *Sa*1, *Sb*1 and *Sc*1 when closed apply input signals to the input terminals A, B and C respectively of resistors R*a*, R*b*, R*c* of a resistance summing network which is connected to —V terminal of a suitable source by means of a tie-off or bias resistor R. The switches provide connections to the plus or zero voltage terminals of the source, thus producing different voltage levels at the terminal or summing node N designated $V_0$ or output voltage, which may be applied to a suitable sensing device such as illustrated hereinafter.

Referring to FIGURE 1*b*, curve V1 shows how the voltage $V_0$ at the summing junction N behaves vs. the number of the switches *Sa*1, *Sb*1 and *Sc*1 which are closed. It will be noted that when any one switch is closed a relatively large jump in voltage occurs, the voltage swinging from $-V$ to $-V/2$ in one step. When the second switch is closed a smaller jump occurs, the voltage merely moving from $-V/2$ to $-V/3$. Likewise, when the third switch is closed an even smaller jump occurs, the voltage moving from $-V/3$ to $-V/4$. Now this circuit with three inputs has a fan-in of only three. Should the circuit have a fan-in of four, five, six or more, the first step will be proportionately smaller, and the crowding or cutting down of the subsequent steps becomes even more severe. The tolerance problem reflects itself in the staircase shape of the voltage curve V1 as shown in FIGURE 1*b*. It should be realized that the voltages themselves, such as —V and 0, the configuration of the staircase itself as well as the resistors R*a*, R*b*, R*c*, etc. all exhibit variations from these specified values within the excepted tolerance range. Also the switches S*a*1, S*b*1 and S*c*1 themselves generally would not be ideal elements, and would have the leakage currents when open and finite forward drops when closed, particularly when such switches are semiconductors and the like. Accordingly, the idealized staircase form as shown is not achieved in actual practice, but there is obtained instead an indistinct or fuzzy staircase in which the treads each have a definite band width or thickness, and the height of the riser itself is not of the ideal height as pictured, only a certain segment of each riser being useful. It should be further realized that a sensing element applied to sense the voltage level $V_0$ at the summing terminal N will also have some tolerance variations associated with it. Accordingly, in transistor resistor type logic (TRL) only the first step in a threshold circuit is sufficiently high to be useful. This situation is reflected by the fact that most TRL circuits are only capable of one-out-of-three, or in exceptional cases, one-out-of-four, type logic statements. This means that only the first step is used, and only a NAND or NOR family is achieved, the threshold being applied through the first riser. For example, in the CTRL and the NOR families of the transistor resistor type logic we are only able to achieve a fan-in of three, that is a one-out-of-three logic circuit, given the 4 percent power supplies and the 5 percent resistors that we generally design with. Repeated attempts have been made, but never successfully, to worst-case-design a two-out-of-three input block, that is to apply the threshold through the second riser. The tolerance variations encountered are just not right to accomplish this.

Referring to FIGURES 2*a* and 2*b* it will be seen that the situation can be improved with a circuit such as shown in FIGURE 2*a* wherein terminals A, B and C of summing resistors R*a*, R*b*, R*c* are selectively connected either to —V or 0 volts through single pole double throw switches S*a*2, S*b*2, S*c*2 respectively. Now instead of having the resistors either open or connected in the circuit, they are collectively connected either to the 0 terminal of the source or to the —V terminal of the source and are always in the circuit. The voltage $V_0$ at the summing node N will as shown by the curve V2 in FIGURE 2*b* switch from —V to $-2V/3$ when the first switch is closed; thence to $-V/3$ when the second switch is closed, and to 0 volts when all three switches are closed. Accordingly, as one sequentially flips the switches from —V to 0 the risers of the staircase voltage wave form curve V2 are all of equal height. Referring back to FIGURE 1*b*, it will be seen that the first step was $V/2$ in height, and the subsequent steps were less, and were more crowded. With the circuit of FIGURE 2*a*, each of the steps is exactly $V/3$ in height as shown in FIGURE 2*b*. While there is no giant first step such as the $V/2$ of FIGURE 1*b*, all of the steps are now equal, and one has the opportunity of applying the threshold in any one of the three risers and incurring only equal difficulty with the tolerances, instead of the increasing difficulty with tolerances associated with the circuit of FIGURE 1*a*. If a hypothetical threshold T2 is represented by the dotted line as drawn in FIGURE 2 at $-V/2$ and this would be the type of threshold one might apply were one trying to trealize a two-out-of-three block. Referring particularly to the curve V5 of FIGURE 5, it will be seen that if one goes to a five input circuit there are now five risers, and each riser is $V/5$ in height. The indistinct or fuzzy area of the treads which is due to tolerance variations is represented by the shaded portions on each tread. The diagonally slashed areas indicate the accumulation of circuit tolerance variations due to variations in the 0 volts, the —V volts values, the drop in the switches and the tolerance variation of the different resistors. A threshold T5 is selected at $V/2$ and by cross-hatching or shading the tolerance variations of $V/2$ are indicated which arise because of variations in the sensing element alone. For a given type of sensing element such as a transistor or the like, the threshold tolerance variations are such that the cross-hatched area would be a constant. It will be realized that where there are only three steps, the cross-hatched area would fit better within the shaded tread tolerances. Were one to try to go to a seven input block with seven risers, using the tolerances as shown in the figure, it will be realized that the seven input block would not be possible to design. In the drawing is shown a five input device in which the threshold area is just accommodated between the shaded portions of the risers. Of course, a lesser included block such as a three input threshold block will, of course, be possible wherever a five block is possible.

We can, therefore, represent the difficulty occasioned by tolerance variations in components or circuit parameters by saying that a three input block would be possible, a five input block would be possible, and a seven input block would not be possible. Henceforth, this terminology will be used for the summation of input weights; if there is a fan-in of five, the logic circuit will be described as having a difficulty factor of five, or being a difficulty five block. If there is a fan-in of seven total, it will be described as a difficulty seven block, etc.

Referring to FIGURE 3*a*, there is shown a circuit embodying a sensing device 5 of a type which may be utilized with any of the threshold logic blocks herein described. For example, a two-out-of-three input block is assumed. The summing resistors R*a*, R*b*, R*c* may be connected by means of switches (not shown) similar to those of FIG. 2 either to plus 6 or minus 6 volts. A Zener diode Z provides a connection between the summing node N and the base of a transistor T. The emitter of the transistor is connected to +6 volts and the collector is connected to —12 through a collector resistor 34. The output terminal 35 is clamped to —6 volts by means of a diode D3. Now the votlage $V_0$ at the summing node N to the left of the Zener diode Z would therefore swing between —6 and +6 volts. To provide a definite threshold (the one shown in FIGURE 2*b* as $-V/2$ volts), a Zener diode Z is utilized having a 6 volt drop. The drop from the summing junction N to the emitter would therefore normally be 6 volts. This saturating transistor T has its collector returned to —12 volts and is clamped at —6 volts, therefore supplying an output voltage which is normally between —6 and +6 which is the same as that assumed for the input signals. For example, when two of the three input resistors R*a* through R*c* are connected to +6 there is not sufficient voltage to overcome the 6 volt Zener bias, and the transistor T will not be switched to conduction, and the voltage at the output terminal 35 will remain at the —6 volts. When only one of the resistors is connected to +6 the node N will be at a negative voltage and the transistor T will switch, so that terminal 35 swings to +6. This provides an inverter majority logic function. If a positive function is desired the output at 35 can be inverted or the input polarity reversed.

In FIGURE 3*b* is shown a symbolic representation of the block of FIGURE 3*a*, this being in effect a three input majority block M3 followed by an inverter I, the output switching function being given by a majority of A, B or C, the function being overlined to account for the inverter function, thus making it a negative or not function. This block is described generally as a majority block or a two-out-of-three block.

If it is desired to achieve the relatively simple function of a three-way AND with a majority block M4, the conventional way to do this is build a circuit such as shown in FIGURE 4*b* and as shown schematically in FIGURE 4*a*. This is, in fact, a five input block, and two of the inputs are tied to the minus terminal of the reference source, with the other three A, B and C all being required to be connected to the plus or "one" reference terminal of the source as shown schematically in FIGURE 4*a*. As shown in FIGURE 4*b*, the summing circuit comprises resistors R*a*, R*b* and R*c* connected together to the sensing device which may be the inverted output of transistor T and Zener diode Z circuit of FIGURE 3*a*, for performing the logic function $F=A \cdot B \cdot C$.

As shown in FIGURE 4*b*, the input signals are applied to the terminals A, B and C of the summing resistors R*a*, R*b* and R*c*, by way of switches (not shown) similar to the switches S*a*2, S*b*2 and S*c*2 of FIGURE 2*a*, which selectively connect the resistors either to +V or −V volts. These three resistors are used as inputs, the other two being tied in parallel to −V and staying there constantly and are designated as $R/2$, which is their equivalent value. The circuit element S represent a threshold element such as shown in FIGURE 3*a* comprising, for example, a Zener diode Z, a diode D3 and a transistor T. This three-way AND circuit is a difficulty five circuit in the sense of FIGURE 5.

In order to show how we get rid of the tie-off resistor, let us consider the switching function shown in FIGURE 6*a* in which a nine input threshold block M6 is connected to achieve the Boolean function A and B or C or the quantity B and C and D $[A(B+C)+BCD]$. This is achieved by connecting R*a*6 (R/3) the equivalent of three input resistors to terminal A6, R*b*6 (R/2) to terminal B6, R*c*6 (R/2) to terminal C6 and a single one R*d*6 to the terminal D6. The remaining bias or ninth input resistor R would be tied to a constant minus or zero reference as shown schematically in FIGURES 6*a* and 6*b*. For the moment, let us ignore the terminals A6, B6 and C6 and concentrate on the variable of terminal D6. As shown in FIGURE 7*a*, the variable of D6, R*a*6 is in the plus or "one" state so that the summing node N is connected by resistor R*a*6 to +V and by the fixed or tie-off resistor R to −V. The voltage $V_0$ at the node N is theerfore substantially at zero potential and no current would flow into the remaining elements attached to the node. If the terminal D6 is in the minus or zero state as shown in FIGURE 7*b*, it will be seen that we have effectively two resistors of the value R attached to −V. As far as current flow to or from the summing node goes, these can be replaced by a diode D3 and a resistor R*d*6′ having a value $R/2$ and as shown in FIGURE 8. Notice that the inputs A6, B6 and C6 have not changed but we have only substituted for the input resistor R*d*6 and the tie-off resistor R. The equivalent element is a diode D3 connected as shown and a resistor R*d*6′ in series having a value of $R/2$. If the input D6 is in the +V state no current flows through the diode and no current is contributed to the summing node. If input D6 is in the minus state, the diode D3 becomes forward biased, and the resistor R*d* can, in fact, supply two units of current to the summing nodes as required in FIGURE 7*b*. The first aim of the invention is then achieved in that the tie-off resistor has been removed from the circuit. The tolerance of the circuit is still of difficulty nine and no appreciable improvement has been made in the tolerance variations at this point.

As was stated in the beginning, there are two objects of this invention: (1) the improvement of the tolerance situation and (2) the further expansion of the circuitry to achieve the best of both the analog and digital options in both the threshold and the conventional vertex logic. Although the tolerance situation has not been improved up to this point, it is easy to see that by having once placed the diode D3 in input D6, we now have the capability of fanning out input D6 to represent a many-input AND function as shown in FIGURE 9*a*. While there would be some limitation due to reverse leakage currents in non-ideal diodes that would limit the fan-in of input D6 for practical purposes we now have a multiple way fan-in capability. Supposing, for instance, that ten diodes were used to extend this point. The tolerance difficulty would still remain nine. In the circuit as shown in FIGURE 9*a* the variable D in the Boolean statement has been replaced with inputs D6, E6 and F6, each with a diode D3. To achieve the same function $$F=A(B+C)+BCDEF$$

with a strictly linear switching element would require a majority block of the form as shown in FIGURE 9*b*. It will be noted that in FIGURE 9*b* the input A9 is weighted seven, B9 is weighted four and C9 is weighted four, inputs D9, E9 and F9 each weighted one, and three inputs must be tied together to the minus or zero reference. The circuit of M9 of FIGURE 9*b* is then of a difficulty 21 and is probably not realizable in any reasonable technology. However, the function of such a difficulty 21 circuit is, in fact, realized as a difficulty nine circuit using the quasi-linear approach as shown in FIGURE 9*a*. This function can be thought of as using a difficulty nine circuit such as the original circuit of FIGURE 6, and extending the input D6 through a conventional three-way AND circuit. But now it must be realized that there are two blocks of delay to this logic and two blocks of hardware are used.

Referring to FIGURES 4*a* and 4*b*, it will be noted that a simple three-way AND statement required a difficulty five block, or a difficulty $2n-1$ block where $n$ is the number of effective inputs desired. One can state generally that a difficulty four AND circuit require a difficulty seven block. A five-way AND circuit would require a difficulty nine block, a six-way AND circuit would require a difficulty eleven block, etc. Now notice in FIGURE 10 how a difficulty three block with diodes D3 would accomplish an unlimited AND statement while still within the restriction of a finite number on the AND extensions due to the problem of diode linkage. As illustrated in FIGURE 10, a twenty-six way AND circuit is only of difficulty three, whereas with a pure threshold approach to the logic a fan-in of twenty-six AND circuits would require a difficulty fifty-one block.

Referring to FIGURES 11*a*, *b* and *c* there is shown a mathematical formulation for handling the removal of the tie-off resistor. The five input threshold block connected as shown in FIGURE 11*a* will realize the switching function $F=A(B+C)$, as shown for M11 in FIGURE 11*b*. In this case, input A11 is weighted two inputs, B11 and C11 are each weighted one and the remaining or fifth input is tied off to a zero or a minus reference. This is all represented in the matrix shown in FIGURE 11*c*, wherein is assigned to each variable and the bias, a column of values. Provision is also made for a row of values for each the up and down situation for each variable in each column. It will be noticed in the matrix in 11*c*, for instance, in the first column input A11 will supply two units of current to the summing node when the switch is up, and when the switch is down will remove two units, hence the +2 and −2 values. Variables B11 and C11 considered similarly are represented as a +1 in the up state and supplying one unit of current, and −1 in the down state, that is removing one unit of current. The bias column is considered as though the bias is a variable that is always down and this is a −1, no matter which position the switches are in. Therefore, a −1 is entered in both the up and the down row for the bias. In the right-hand column, the variables and the bias are summed, giving a +3 for the up state and for the down state total of −5.

In performing the column sum, which has been indicated as an absolute sum, we are interested in the total change of current resulting from a change in the variable. That is, input A11 first supplies to and then withdraws from the summing node two units of current and its absolute sum is in four units of current, while the sums for variables B11 and C11 are each two units of current. The technique of removing the bias column is as follows: One needs only to take the numbers appearing in the bias column and move them to the left, that is into one or more of the variable columns and include them there. The only guide line we maintain is that each variable column absolute sum must be maintained, as well as the row sums. In FIGURE 12*a* is shown one possible way of removing the bias column. That is, it is algebraically added into column C12 resulting in a new column C12 of 0 and −2, whereupon the bias column is represented as 0—0. That is, we have eliminated the tie-off resistor. We can re-translate this modified matrix into a new circuit as shown in FIGURE 12*b*, where a variable A12 still has a value of $R/2$, variable B12 remains at the value of R, but the variable C12 now that its to supply no current in the up state needs a blocking diode D3, and since it is to remove two units of current in the down state, it requires an $R/2$ resistor Rc12. Notice that we are now able, having included the diode D3 in the input state to do AND fan on variable C12 as shown on the right-hand side at FIGURE 12*b* where inputs D12 and E12 are added by means of additional diodes D3, without increasing athe tolerance difficulty of the circuit over all.

As another possible manipulation of the basic matrix of FIGURE 11*c*, let us consider the matrix of FIGURE 13*a*. Here we have taken the bias column, and algebraically added into column A13 the bias values in order to move the diode-resistor location. The resulting matrix shown in FIGURE 13*a* translates to the circuit shown in FIGURE 13*b*. Now this circuit is not possibly as useful as the circuit of FIGURE 12*b* in that it is not directly extendable as was the circuit of FIGURE 12*b*. However, FIGURE 13*b* does illustrate an important point. One can arrive at a rather odd looking column of A13 of 1—3 that does have physical sense and is a possible realization. In fact, input A13 of FIGURE 13 represents the most general type of input. Notice that when A13 is up, the diode D3 is blocked and but one unit of current flows through R*a*13 which has a value R. When the input A13 is down, one input of current flows through R*a*13 as well as two units of current through R*a*13′ which has a value R/2, resulting in a total withdrawal of three units of current from the summing node. It will be found that this arrangement is convenient in somewhat more complicated realizations of more complicated logical functions. In order to maintain the proper row and column sums, it is often desirable to have the ability to create a network for variables such as for A13 in FIGURE 13, in order to make these sums come out properly. Another possible variation in the matrix is shown in FIGURES 14*a* and 14*b*, where again we shuffle the columns and rows always maintaininng the vertical and horizontal sums. This corresponds to the circuit realization shown in FIGURE 14*b* where diodes D3 are used to make input A14 AND extendable with terminals M14, N14 and input C14 has become OR extendable with terminals W14, X14 and diodes D3 to accomplish the function $F=(A\cdot M\cdot N\cdot\cdot)$ $$(B+C\cdot W\cdot X\cdot\cdot)$$

It is to be emphasized again that this circuit is still only a difficulty five. As an example of the difficulty of accomplishing this switching function by conventional means, if the input A14 were extended only to a three-way AND and input C14 were extended to a three-way OR, the resulting function happens to be linearly separable but requires a difficulty forty-one block.

As a further example, consider FIGURE 15*a* and 15*b* where the weights have been reshuffled such that input A15 is the most general type of input with R*a*15 equal R, and R*a*15′ equal $R/3$ in series with diode D3 and not extendable, however, input B15 has become OR extendable with diodes D3 and input C15 has become AND extendable with diodes D3. The resulting switching function is $F=A[(B+M+N+)+(C\cdot W\cdot X)]$. The tolerance difficulty of the circuit remains, however, difficulty five.

From the above-description and the accompanying drawings it will be apparent that we have provided for the accomplishment of majority logic switching functions in a quasi-linear form. By utilizing, for example, diode circuitry in conjunction with summing resistors tolerance conditions of logical functions may be greatly improved by permitting almost endless extension of the switching functions. In addition, it is possible to achieve the result of assigning different weights to the variable in the up condition and the down condition, and by utilizing the matrix arrangement hereinbefore described, we have greatly facilitated the achievement of relatively complex logic circuitry which heretofore was extremely difficult to realize.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. In a majority logic device,
a semiconductor device current sensor,
a plurality of input terminals,
means connected to selectively apply to different ones of said terminals one of two different voltage level signals,
impedance means connecting the terminals individually to the semiconductor device to effect control of said semiconductor device, at least one of said terminals being connected to said semiconductor device by a pair of impedance means of different values in parallel circuit relation,
and diode means connected in series circuit relation with one of said impedance means in said parallel circuit between the associated terminal and semiconductor device current sensor.

2. In a majority logic circuit,
a current sensor,
a plurality of input terminals,
means for selectively connecting different ones of said terminals to one of two different voltage levels of a source of electrical energy,
impedance means having weighted values connecting different ones of said terminals to said senors,
diode means connected in series with at least one of said impedance means to block the flow of current in one direction when the associated terminal is connected to one of the voltage levels,
and other diode means connected in series with at least one other of said impedance means in the opposite direction.

3. In a majority logic circuit,
a current sensor,
a plurality of input terminals,
means for selectively connecting different ones of said terminals to two different voltage levels of a source of electrical energy,
a first impedance means connecting a first one of said terminals to said sensor,
a first diode means connected in one sense in series with said first impedance means and its associated terminal to block the flow of current when the associated terminal is connected to one of said voltage levels,
a second impedance means connecting a second one of said terminals to said sensor,
a second diode means connected in the opposite sense in series with said second impedance means and said sensor,
a third impedance means connecting a third one of said terminals to said sensor, said third impedance means comprising two resistors of different values connected in parallel circuit relation with each other, and a third diode means connected in series with one of said resistors in said parallel circuit relation.

References Cited

UNITED STATES PATENTS

| | | | |
|---|---|---|---|
| 2,803,815 | 8/1957 | Wulfsberg | 307—88.5 X |
| 3,032,664 | 5/1962 | Rowe | 307—88.5 |
| 3,048,716 | 8/1962 | Seley | 307—88.5 |
| 3,093,751 | 6/1963 | Williamson | 307—88.5 |
| 3,243,652 | 3/1966 | Meyer | 307—88.5 X |

FOREIGN PATENTS

| | | |
|---|---|---|
| 162,722 | 8/1953 | Australia. |
| 837,296 | 6/1960 | Great Britain. |

OTHER REFERENCES

Millman et al.: Pulse and Digital Circuits, McGraw-Hill, 1956, p. 404 relied on.

ARTHUR GAUSS, *Primary Examiner.*

D. D. FORRER, *Assistant Examiner.*